(12) United States Patent
Underwood et al.

(10) Patent No.: US 8,148,583 B2
(45) Date of Patent: Apr. 3, 2012

(54) FEED GAS CONTAMINANT REMOVAL IN ION TRANSPORT MEMBRANE SYSTEMS

(75) Inventors: Richard Paul Underwood, Allentown, PA (US); Alexander Makitka, III, Hatfield, PA (US); Michael Francis Carolan, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 48 days.

(21) Appl. No.: 12/774,941

(22) Filed: May 6, 2010

(65) Prior Publication Data

US 2011/0275866 A1  Nov. 10, 2011

(51) Int. Cl.
- C07C 27/14 (2006.01)
- C01B 13/00 (2006.01)
- C01B 3/24 (2006.01)

(52) U.S. Cl. ........ 568/959; 252/373; 423/210; 423/579; 423/650; 423/651; 423/652

(58) Field of Classification Search ................ 95/54, 94; 423/579, 650, 651, 652, 210; 252/373; 568/959
See application file for complete search history.

(56) References Cited

U.S. PATENT DOCUMENTS

| | | | |
|---|---|---|---|
| 3,990,998 A | 11/1976 | DeLuca et al. | |
| 4,163,736 A | 8/1979 | Acres et al. | |
| 6,048,472 A * | 4/2000 | Nataraj et al. | 252/373 |
| 6,066,307 A * | 5/2000 | Keskar et al. | 423/648.1 |
| 6,077,323 A * | 6/2000 | Nataraj et al. | 48/198.1 |
| 6,110,979 A * | 8/2000 | Nataraj et al. | 518/704 |
| 6,114,400 A * | 9/2000 | Nataraj et al. | 518/715 |
| 6,402,988 B1 * | 6/2002 | Gottzmann et al. | 252/373 |
| 6,492,290 B1 | 12/2002 | Dyer et al. | |
| 6,537,465 B2 * | 3/2003 | Gottzmann et al. | 252/373 |
| 6,695,983 B2 * | 2/2004 | Prasad et al. | 252/373 |
| 7,179,323 B2 | 2/2007 | Stein et al. | |
| 7,229,537 B2 * | 6/2007 | Chen et al. | 204/295 |
| 7,279,025 B2 * | 10/2007 | Apte et al. | 95/54 |
| 7,311,755 B2 * | 12/2007 | Carolan | 95/54 |
| 7,335,247 B2 | 2/2008 | Stein et al. | |
| 7,425,231 B2 | 9/2008 | Carolan et al. | |
| 7,427,368 B2 * | 9/2008 | Drnevich | 252/373 |
| 7,556,675 B2 * | 7/2009 | Carolan et al. | 96/7 |
| 7,658,788 B2 | 2/2010 | Holmes et al. | |
| 2005/0106439 A1 * | 5/2005 | Carolan et al. | 429/33 |
| 2008/0047431 A1 * | 2/2008 | Nagabhushana et al. | 96/11 |

FOREIGN PATENT DOCUMENTS

| | | |
|---|---|---|
| EP | 1312407 A1 | 5/2003 |
| EP | 1676624 A2 | 7/2006 |
| EP | 2027909 A2 | 2/2009 |

* cited by examiner

*Primary Examiner* — Wayne Langel
(74) *Attorney, Agent, or Firm* — Bryan C. Hoke, Jr.

(57) ABSTRACT

An oxygen ion transport membrane process wherein a heated oxygen-containing gas having one or more contaminants is contacted with a reactive solid material to remove the one or more contaminants. The reactive solid material is provided as a deposit on a support. The one or more contaminant compounds in the heated oxygen-containing gas react with the reactive solid material. The contaminant-depleted oxygen-containing gas is contacted with a membrane, and oxygen is transported through the membrane to provide transported oxygen.

12 Claims, 3 Drawing Sheets

FEED GAS CONTAMINANT REMOVAL IN ION TRANSPORT MEMBRANE SYSTEMS

STATEMENT REGARDING FEDERALLY SPONSORED RESEARCH OR DEVELOPMENT

This invention was made with government support under Contract Number DE-FC26-98FT40343 between Air Products and Chemicals, Inc. and the U.S. Department of Energy. The U.S. Government has certain rights to this invention.

BACKGROUND

The permeation of oxygen ions through ion transport membranes is the basis for a variety of gas separation devices and oxidation reactor systems operating at high temperatures in which permeated oxygen is recovered on the permeate side as a high purity oxygen product or is reacted on the permeate side with oxidizable compounds to form oxidized or partially oxidized products. The practical application of these gas separation devices and oxidation reactor systems requires membrane assemblies having large surface areas, means to contact feed gas with the feed sides of the membranes, and means to withdraw product gas from the permeate sides of the membranes. These membrane assemblies may comprise a large number of individual membranes arranged and assembled into modules having appropriate gas flow piping to introduce feed gas into the modules and withdraw product gas from the modules.

Ion transport membranes may be fabricated in either planar or tubular configurations. In the planar configuration, multiple flat ceramic plates are fabricated and assembled into stacks or modules having conveying means to pass feed gas over the planar membranes and to withdraw product gas from the permeate side of the planar membranes. In tubular configurations, multiple ceramic tubes may be arranged in bayonet or shell-and-tube configurations with appropriate tube sheet assemblies to isolate the feed and permeate sides of the multiple tubes.

The individual membranes used in planar or tubular module configurations typically comprise very thin layers of active membrane material supported on material having large pores or channels that allow gas flow to and from the surfaces of the active membrane layers.

The solid ion-conducting metallic oxide materials used in these membrane modules may degrade in the presence of volatile gas-phase contaminants at the high operating temperatures required to effect ion conduction, thereby reducing the ability of the membranes to conduct or permeate oxygen ions. Because of this potential problem, the successful operation of ion-conducting metallic oxide membrane systems may require control of certain contaminants in the membrane feed gas or gases.

As disclosed in U.S. Pat. No. 7,425,231, contaminants may be removed by a reactive solid material in a guard bed, the reactive solid material comprising one or more compounds selected from the group consisting of magnesium oxide, calcium oxide, copper oxide, calcium carbonate, sodium carbonate, strontium carbonate, zinc oxide, strontium oxide, and alkaline-earth-containing perovskites.

While these reactive solid materials are good getters for the contaminants, the reaction of the reactive solid materials is accompanied by expansion of the reacted solid material. For example, reaction of chromium (Cr) with magnesium oxide (MgO) forms stable bulk magnesiochromite ($MgCr_2O_4$) with an estimated 385% volume expansion of the solid phase. This may present a significant challenge for the use of guard bed materials comprising bulk reactive solid materials as disclosed in U.S. Pat. No. 7,425,231. The increase in volume could cause degradation of the guard bed and/or a reduction in void fraction accompanied by an associated increase in pressure drop.

Industry needs a contaminant removal device and process that can accommodate the volume expansion, have enough capacity to remove contaminants for years, and also have low pressure drop.

This need is addressed by embodiments of the present invention as disclosed below and defined by the claims that follow.

BRIEF SUMMARY

The present invention relates to an oxygen ion transport membrane process. The oxygen ion transport membrane process may be an oxygen production process or an oxidation process.

There are several aspects of the process as outlined below.

Aspect #1. An oxygen ion transport membrane process comprising:
(a) contacting a heated oxygen-containing gas with a reactive solid material, the heated oxygen-containing gas comprising oxygen and one or more contaminant compounds, the reactive solid material provided as a deposit on a support, reacting the one or more contaminant compounds in the heated oxygen-containing gas with the reactive solid material under reaction conditions sufficient to react the one or more contaminant compounds with the reactive solid material thereby forming a contaminant-depleted oxygen-containing gas and reacted solid material;
(b) contacting the contaminant-depleted oxygen-containing gas with a first surface of a membrane comprising mixed conducting multicomponent metallic oxide, and transporting oxygen through the membrane to a second surface of the membrane to provide transported oxygen.

Aspect #2. The process according to aspect #1 wherein the reaction conditions sufficient to react the one or more contaminant compounds with the reactive solid material include a first temperature ranging from 100° C. to 1100° C. and a first pressure ranging from 1.5 atm (absolute) (0.15 MPa) to 40 atm (absolute) (4.05 MPa).

Aspect #3. The process according to aspect #1 or aspect #2 wherein the reactive solid material is in a guard bed.

Aspect #4. The process according to any one of aspects #1 to #3 wherein the support is a monolithic structure.

Aspect #5. The process according to any one of aspects #1 to #4 wherein the support comprises at least one of alumina, mullite, zirconia, silicon carbide, magnesium oxide and cordierite.

Aspect #6. The process according to any one of aspects #1 to #5 wherein the deposit on the reactive solid material is porous.

Aspect #7. The process according to any one of aspects #1 to #6 wherein the heated oxygen-containing gas does not undergo a catalyzed reaction when contacting the support or any deposits on the support.

Aspect #8. The process according to any one of aspects #1 to #7 wherein at least one of the one or more contaminant compounds in the heated oxygen-containing gas is $SO_2$, $SO_3$, $H_2SO_4$, $CrO_2(OH)_2$, $Si(OH)_4$, $WO_2(OH)_2$, $CrO_3$, oxides of molybdenum, or oxy-hydroxides of molybdenum.

Aspect #9. The process according to any one of aspects #1 to #8 wherein the reactive solid material comprises one or more compounds selected from the group consisting of magnesium oxide, nickel oxide, magnesium aluminate, calcium oxide, copper oxide, calcium carbonate, sodium carbonate, potassium carbonate, strontium carbonate, sodium oxide, potassium oxide, barium oxide, barium carbonate, cerium oxide, zinc oxide, strontium oxide, and alkaline-earth-containing perovskites.

Aspect #10. The process according to any one of aspects #1 to #7 wherein at least one of the one or more contaminant compounds in the heated oxygen-containing gas is $SO_2$, $SO_3$, or $H_2SO_4$, and wherein the reactive solid material comprises one or more compounds selected from the group consisting of magnesium oxide, nickel oxide, magnesium aluminate, calcium carbonate, sodium carbonate, potassium carbonate, strontium carbonate, barium carbonate, calcium oxide, sodium oxide, potassium oxide, strontium oxide, barium oxide and cerium oxide.

Aspect #11. The process according to any one of aspects #1 to #7 wherein at least one of the one or more contaminant compounds in the heated oxygen-containing gas is $CrO_2(OH)_2$, $Si(OH)_4$, $WO_2(OH)_2$, $CrO_3$, oxides of molybdenum, or oxy-hydroxides of molybdenum and wherein the reactive solid material comprises one or more compounds selected from the group consisting of magnesium oxide, calcium oxide, copper oxide, calcium carbonate, sodium carbonate, strontium carbonate, zinc oxide, strontium oxide, barium oxide, barium carbonate, and alkaline-earth-containing perovskites.

Aspect #12. The process according to any one of aspects #1 to #7 wherein the reactive solid material comprises magnesium oxide and the support comprises cordierite.

Aspect #13. The process according to any one of aspects #1 to #12 further comprising discharging the transported oxygen as an oxygen product.

Aspect #14. The process according to any one of aspects #1 to #12 further comprising reacting a hydrocarbon-containing feed gas with the transported oxygen under reaction conditions sufficient to react the hydrocarbon-containing feed gas with the transported oxygen to form an oxidation product.

Aspect #15. The process according to aspect #14 wherein the reaction conditions sufficient to react the hydrocarbon-containing feed gas with the transported oxygen includes a temperature ranging from 600° C. to 1100° C. and a pressure ranging from 0.2 to 5 MPa.

Aspect #16. The process according to aspect #14 or aspect #15 wherein the oxidation product is synthesis gas comprising hydrogen, carbon monoxide, and water.

Aspect #17. The process according to any one of aspects #14 to #16 further comprising:
contacting a heated hydrocarbon-containing gas with a second reactive solid material, the heated hydrocarbon-containing gas comprising a hydrocarbon and one or more contaminant compounds, the second reactive solid material provided as a deposit on a second support and reacting the one or more contaminant compounds in the heated hydrocarbon-containing gas with the second reactive solid material under reaction conditions sufficient to react the one or more contaminant compounds in the heated hydrocarbon-containing gas with the second reactive solid material thereby forming the hydrocarbon-containing feed gas and a second reacted solid material.

Aspect #18. The process according to aspect #17 wherein the reaction conditions sufficient to react the one or more contaminant compounds in the heated hydrocarbon-containing gas with the second reactive solid material include a second temperature ranging from 500° C. to 1100° C. and a second pressure ranging from 2 atm (0.2 MPa) (absolute) to 50 atm (absolute) (5 MPa).

Aspect #19. The process according to aspect #17 or aspect #18 wherein the second reactive solid material is in a second guard bed.

Aspect #20. The process according to any one of aspects #17 to #19 wherein the second support is a monolithic structure.

Aspect #21. The process according to any one of aspects #17 to #20 wherein the second support comprises cordierite.

Aspect #22. The process according to any one of aspects #17 to #21 wherein the deposit on the second reactive solid material is porous.

Aspect #23. The process according to any one of aspects #17 to #22 wherein the heated oxygen-containing gas does not undergo a catalyzed reaction when contacting the second support or any deposits on the second support.

Aspect #24. The process according to any one of aspects #17 to #23 wherein at least one of the one or more contaminant compounds in the heated hydrocarbon-containing gas is $Si(OH)_4$, $WO_2(OH)_2$, oxides of molybdenum, or oxy-hydroxides of molybdenum.

Aspect #25. The process according to any one of aspects #17 to #24 wherein the second reactive solid material comprises one or more compounds selected from the group consisting of magnesium oxide, calcium oxide, copper oxide, calcium carbonate, sodium carbonate, strontium carbonate, zinc oxide, strontium oxide, sodium oxide, potassium oxide, barium oxide, barium carbonate and alkaline-earth-containing perovskites.

Aspect #26. The process according to any one of aspects #17 to #24 wherein the second reactive solid material comprises magnesium oxide.

BRIEF DESCRIPTION OF SEVERAL VIEWS OF THE DRAWINGS

The process is illustrated with reference to the following drawings, which are not necessarily to scale and are not meant to limit the invention to any of the features shown therein.

DETAILED DESCRIPTION

The present disclosure is directed toward an oxygen ion transport membrane process. The oxygen ion transport membrane process may be an oxygen production process or an oxidation process.

The basic operation of ion transport membrane systems is discussed in U.S. Pat. No. 7,425,231, incorporated herein by reference in its entirety.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

The phrase "at least a portion" means "a portion or all."

The following definitions apply to terms used in the description of the embodiments of the invention presented herein.

Oxygen is the generic term for forms of oxygen comprising the element having an atomic number of 8. The generic term oxygen includes oxygen ions as well as gaseous oxygen ($O_2$ or dioxygen). An oxygen-containing gas may include, but is not limited to, air or gas mixtures comprising one or more components selected from the group consisting of oxygen, nitrogen, water, carbon monoxide, and carbon dioxide.

An ion transport membrane is an active layer of membrane comprising mixed conducting multicomponent metallic oxide capable of transporting or permeating oxygen ions at elevated temperatures. The active membrane layer may comprise one or more elemental metals. The ion transport membrane also may transport electrons as well as oxygen ions, and this type of ion transport membrane typically is described as a mixed conductor membrane. The ion transport membrane also may include one or more elemental metals thereby forming a composite membrane.

The membrane may be part of a membrane structure. The membrane structure may have a tubular configuration in which an oxygen-containing gas flows in contact with one side of the tube (i.e., in either the interior region or the exterior region of the tube) and oxygen ions transport through active membrane material in or on the tube walls to the other side of the tube. The oxygen-containing gas may flow inside or outside of the tube in a direction generally parallel to the tube axis, or conversely may flow over the outer side of the tube in a direction which is not parallel to the tube axis. A module comprises multiple tubes arranged in bayonet or shell-and-tube configurations with appropriate tube sheet assemblies to isolate the feed and permeate sides of the multiple tubes.

Alternatively, the membrane structure may have a planar configuration in which a wafer having a center or interior region and an exterior region is formed by two parallel planar members sealed about at least a portion of the peripheral edges thereof. Oxygen ions transport through active membrane material that may be placed on either or both surfaces of a planar member. Gas can flow through the center or interior region of the wafer, and the wafer has one or more gas flow openings to allow gas to enter and/or exit the interior region of the wafer. Thus oxygen ions may transport from the exterior region into the interior region, or conversely may transport from the interior region to the exterior region.

A wafer is a membrane structure having a center or interior region and an exterior region wherein the wafer is formed by two parallel planar members sealed about at least a portion of the peripheral edges thereof. Active membrane material may be placed on either or both surfaces of a planar member. Gas can flow through the center or interior region of the wafer, i.e., all parts of the interior region are in flow communication, and the wafer has one or more gas flow openings to allow gas to enter and/or exit the interior region of the wafer. The interior region of the wafer may include porous and/or channeled material that allows gas flow through the interior region and mechanically supports the parallel planar members. The active membrane material transports or permeates oxygen ions but is impervious to the flow of any gas.

Flow communication means that components of membrane modules and vessel systems are oriented relative to one another such that gas can flow readily from one component to another component.

A plurality of membrane structures may be arranged in an ion transport membrane module. Components of a membrane module include an active membrane layer that transports or permeates oxygen ions and may also transport electrons, structural components that support the active membrane layer, and structural components to direct gas flow to and from the membrane surfaces. The structural components of the membrane module may be made of any appropriate material such as, for example, mixed conducting multicomponent metallic oxides, and also may comprise one or more elemental metals. Any of the active membrane layer and structural components may be made of the same material. Suitable mixed conducting multicomponent metallic oxides have been disclosed in the art, for example, U.S. Pat. No. 6,492,290, incorporated herein by reference in its entirety.

An ion transport membrane module is an assembly of a plurality of membrane structures which has a gas inflow region and a gas outflow region disposed such that gas flows across the external surfaces of the membrane structures. Gas flowing from the inflow region to the outflow region of a membrane module changes in composition as it passes across the surfaces of the membrane structures in the module. Each membrane structure has an oxygen-containing gas feed side and a "permeate" side separated by an active membrane layer or region that allows oxygen ions to be transported therethrough. While the mechanism for transport of the oxygen may not be strictly "permeation," industry has nonetheless adopted the term "permeate" to describe the oxygen that has been transported through the membrane and "permeate side" of the membrane to describe the side opposite the feed side. The mechanism is believed to be an oxygen ion conduction-type mechanism; however, the process described herein is not to be limited by the actual mechanism of oxygen transport.

Membrane modules may be fabricated in either tubular or planar configurations. Planar configurations are preferred for many applications, and various configurations of planar membrane modules are possible. Planar membrane module configurations are described, for example, in U.S. Pat. Nos. 7,279,027 and 7,513,932, both of which are incorporated herein by reference.

Exemplary planar membrane modules for oxygen production and oxidation processes are disclosed in U.S. Pat. No. 7,425,231.

An ion transport membrane system is a generic term for an array of multiple ion transport membrane modules used for oxygen recovery or for oxidation reactions. An ion transport membrane separation system is an ion transport membrane system used for separating and recovering oxygen from an oxygen-containing gas. An ion transport membrane reactor system is an ion transport membrane system used for oxidation reactions.

An ion transport membrane process is a generic term for a process using an ion transport membrane system.

The oxygen ion transport membrane process of the present disclosure comprises contacting a heated oxygen-containing gas with a reactive solid material. The heated oxygen-containing gas comprises oxygen and one or more contaminant compounds which react with the reactive solid material.

A heated oxygen-containing gas is any gas containing oxygen that has been directly or indirectly heated. Oxygen-containing gases for use in oxygen ion transport membrane processes are known in the art. The heated oxygen-containing gas may be formed by indirectly heating air or other oxygen-containing gas by indirect heat transfer with a fluid that is hotter than oxygen-containing gas in a heat exchanger. The heated oxygen-containing gas may be formed by direct combustion of a gaseous fuel with air or other oxygen-containing gas to form an oxygen-containing gas comprising oxygen, nitrogen, carbon dioxide, and water.

The heated oxygen-containing gas comprises oxygen and one or more contaminant compounds, which enter the heated oxygen-containing gas from structural components of the reactor systems used in oxygen ion transport membrane processes.

Structural components of the reactor systems used in oxygen ion transport membrane processes, as in most chemical reactors, are made of metal alloys that may contain any of chromium, silicon, tungsten, molybdenum, and other elements, and oxides of these elements may form at the alloy surfaces at high operating temperatures.

Structural components also may include oxide refractories that may contain compounds such as silica (silicon dioxide) or other temperature-resistant oxide materials. When these oxides are exposed to gas streams containing steam, such as, for example, hot synthesis gas or air preheated by direct firing, volatile contaminant compounds may form at the alloy or refractory surfaces and sublime into the hot gas stream. Even in the presence of dry oxygen-containing gas, volatile contaminant compounds containing chromium may form from chromium containing alloys.

A contaminant is defined as any compound or element which reacts with components in the structure of a process apparatus and results in reduced performance of the process apparatus. For example, contaminants may react with the mixed conducting multicomponent metallic oxide used for oxygen ion transport membranes and reduce the oxygen transport of the membranes. A volatile contaminant is a compound or element that exists as a gas at elevated temperatures in the range of 600° C. to 1100° C.

Typical volatile contaminants in an oxygen ion transport membrane system may include, for example, any of the gaseous oxy-hydroxide $CrO_2(OH)_2$, the gaseous hydroxide $Si(OH)_4$, the gaseous oxy-hydroxide $WO_2(OH)_2$, oxides of molybdenum and oxy-hydroxides of molybdenum. Similarly, when exposed to oxidizing gases such as air, certain metal oxides may form at the alloy surfaces and sublime into the hot gas stream. One of these volatile metal oxides which may be present is $CrO_3$. Depending on the specific alloys or refractories used in the piping and vessels, other volatile hydroxides, volatile metal oxy-hydroxides, or volatile metal oxides may be present as contaminant compounds in the process gases in oxygen ion transport membrane systems.

Volatile sulfur-containing compounds such as $SO_2$, $SO_3$, $H_2SO_4$, and $H_2S$ may also be present in these gas streams, and these compounds also may reduce the performance and operating life of the ion transport membranes. Other species that may be present in the gas streams include any of $Cl_2$, $Br_2$, $I_2$, and compounds containing any of Cl, Br, and I. These compounds or elements also may reduce the performance and operating life of the ion transport membranes.

The partial pressures of these contaminants may be relatively low under some membrane operating conditions. Under other operating conditions, however, the partial pressures may be high enough for the contaminants to react with the ion transport membrane materials, thereby reducing membrane performance and operating life.

It has been observed that ion transport membranes used for synthesis gas production, when exposed to gas streams containing elevated $CrO_2(OH)_2$, $CrO_3$, $Si(OH)_4$ and $WO_2(OH)_2$ partial pressures at temperatures in the range of 700 to 950° C., experienced rapid oxygen flux decay and low oxygen flux performance. Post-test analyses of these membranes revealed that the air side surfaces of the membranes were coated with Cr-containing oxide while the synthesis gas side surfaces were coated with Si- or W-containing oxides. The pores at the surface of the porous layer on the synthesis gas side of the membrane were nearly completely plugged with contaminant reaction products. It also was observed that when membranes used in oxygen production were exposed to gas streams containing Cr-containing vapor species, Cr-containing oxides were formed on the feed side surfaces of those membranes.

A reactive solid material is any material that reacts with a volatile contaminant to form a non-volatile reaction product. A reacted solid material is the non-volatile reaction product formed by the reaction of the reactive solid material and the volatile contaminant. A precursor to a reactive solid material is any material that thermally or oxidatively transforms to the reactive solid material.

The reactive solid material may be provided in a guard bed. A guard bed is defined as any vessel or enclosure which contains reactive solid material and is designed to allow flowing gas to contact the reactive solid material.

The reactive solid material may comprise one or more compounds selected from the group consisting of magnesium oxide, nickel oxide, magnesium aluminate, calcium oxide, copper oxide, calcium carbonate, sodium carbonate, potassium carbonate, strontium carbonate, sodium oxide, potassium oxide, barium oxide, barium carbonate, cerium oxide, zinc oxide, strontium oxide, and alkaline-earth-containing perovskites. The alkaline-earth-containing perovskites have the general formula $A_xA'_{x'}B_yB'_{y'}O_{3-d}$ where A comprises one or more of lanthanum, yttrium, and one of the lanthanide elements; A' comprises one or more of Ca, Sr, and Ba; B and B' comprise one or more of the first row transition metals Mg, Ga, and Al; $0.9<x+x'<1.1$; $0.9<y+y'<1.1$; $x'>0$; and d is a number that makes the compound charge neutral.

Reactive solid materials comprising one or more compounds selected from the group consisting of magnesium oxide, nickel oxide, magnesium aluminate, calcium carbonate, sodium carbonate, potassium carbonate, strontium carbonate, barium carbonate, calcium oxide, sodium oxide, potassium oxide, strontium oxide, barium oxide, and cerium oxide are particularly suitable for reacting with the contaminant compounds $SO_2$, $SO_3$, and/or $H_2SO_4$.

Reactive solid materials comprising one or more compounds selected from the group consisting of magnesium oxide, calcium oxide, copper oxide, calcium carbonate, sodium carbonate, strontium carbonate, zinc oxide, strontium oxide, barium oxide, barium carbonate, and alkaline-earth-containing perovskites are particularly suitable for reacting with the contaminant compounds $CrO_2(OH)_2$, $Si(OH)_4$, $WO_2(OH)_2$, $CrO_3$, oxides of molybdenum, or oxy-hydroxides of molybdenum.

The reactive solid material may be located at any suitable location for removing contaminants prior to passing the gas to the membrane. Suitable locations are disclosed in U.S. Pat. No. 7,425,231.

The reactive solid material is provided as a deposit on a support. Providing the reactive solid material as a deposit on a support solves the problem of volume expansion of the reacted solid material because the combination of a deposit on a support better accommodates the volume expansion. Since the volume expansion of the reacted solid material is better accommodated, pressure drop through the system is not negatively impacted. By providing a suitable amount of the reactive solid material, enough capacity to remove contaminants for the desired period may be achieved.

The deposit may be a layer, coating, or the like. The reactive solid material or a precursor of the reactive solid material may be deposited on the support by a washcoat, incipient wetness impregnation of a dissolved species comprising the reactive solid material or a precursor of the reactive solid material, infiltration of a dissolved species comprising the reactive solid material or a precursor of the reactive solid material, slurry coating of a suspension comprising the reactive solid material or a precursor of the reactive solid material, dip coating of a dissolved or suspended species comprising the reactive solid material or a precursor of the reactive solid material, infiltration or dip coating using a molten salt comprising the reactive solid material or a precursor of the reactive solid material, combinations of these methods or any other suitable means.

The deposit on the reactive solid material may be porous.

The support may comprise at least one of alumina, mullite, zirconia, silicon carbide, magnesium oxide and cordierite. The support may be porous. The reactive solid material may be deposited within the pores of the support. The support may be a monolithic structure. Monolithic structural supports are well-known in the catalyst art, for example a catalytic converter in an automobile.

Since the purpose of the deposit of the reactive material on the support is to react the contaminant species and not to react the other species in the heated oxygen-containing gas, the process may be such that the heated oxygen-containing gas does not undergo a catalyzed reaction when contacting the support or any deposits on the support. The support may be such that no catalyst is deposited thereon.

The one or more contaminant compounds in the heated oxygen-containing gas reacts with the reactive solid material under reaction conditions sufficient to react the one or more contaminant compounds with the reactive solid material thereby forming a contaminant-depleted oxygen-containing gas and reacted solid material.

The reaction conditions sufficient to react the one or more contaminant compounds with the reactive solid material may include a first temperature ranging from 100° C. to 1100° C. and a first pressure ranging from 1.5 atm (absolute) (0.15 MPa) to 40 atm (absolute) (4.05 MPa).

The contaminant-depleted oxygen-containing gas is the gas formed from the heated oxygen-containing gas which has been depleted of a portion or all of a contaminant compound. As used herein, "contaminant-depleted" does not require complete removal of any or all of the contaminant compounds.

The oxygen ion transport membrane process also comprises contacting the contaminant-depleted oxygen-containing gas with a first surface (or so-called feed side) of a membrane comprising mixed conducting multicomponent metallic oxide, and transporting oxygen through the membrane to a second surface (or so-called permeate side) of the membrane to provide transported oxygen. The transported oxygen may be removed from the second surface of the membrane and an oxygen-depleted gas may be removed from the first surface.

The membrane may operate at any suitable temperature wherein the membrane possesses anion mobility. A typical temperature range for operating the membrane is 600° C. to 1100° C.

The process may be an oxygen production process and the process may further comprise discharging the transported oxygen as an oxygen product. The oxygen product may contain at least 95 vol % oxygen.

Figure 1:
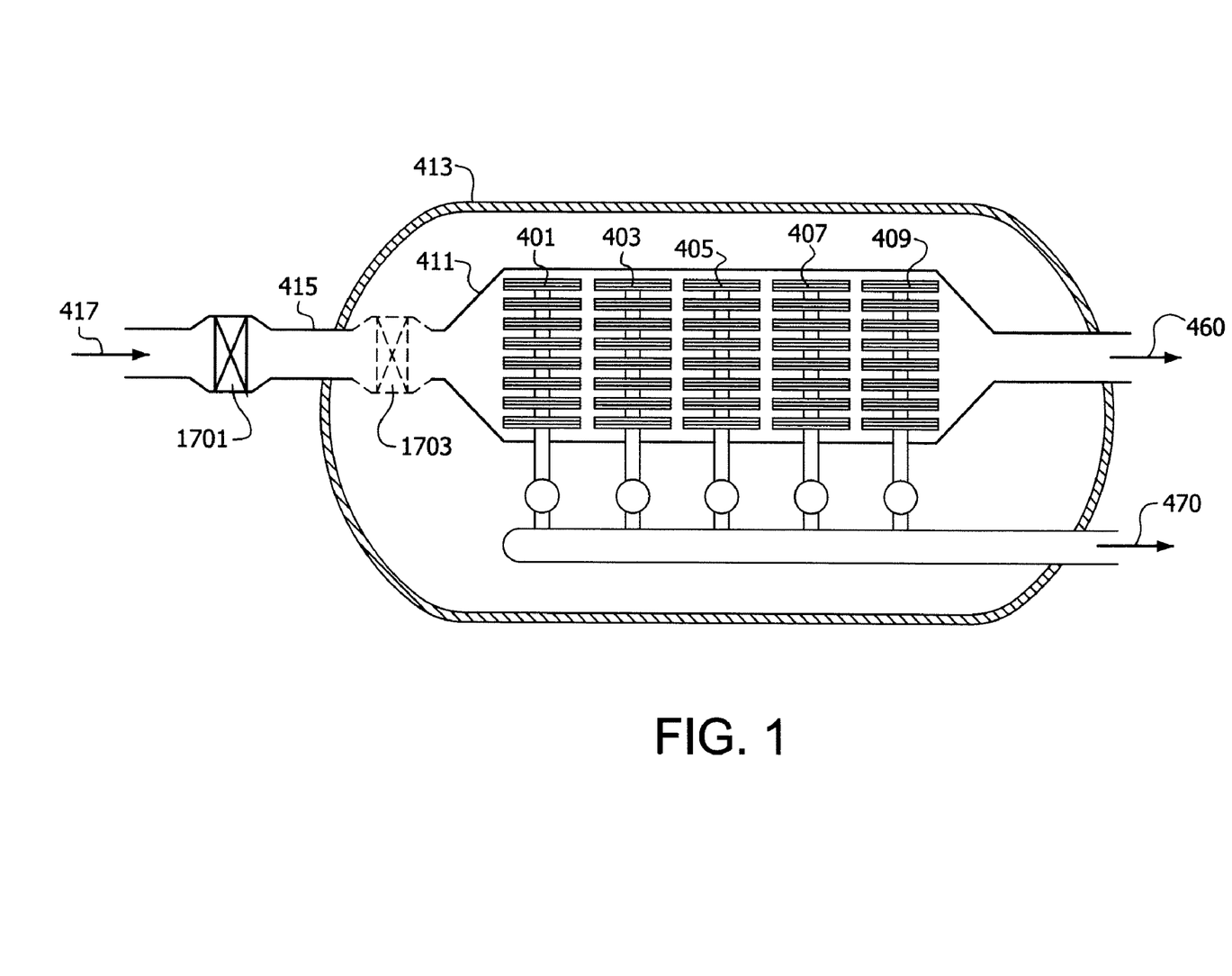
FIG. 1 is a schematic side view of the interior of a membrane separator vessel for use in oxygen production that includes reactive solid material for the removal of volatile contaminants from the oxygen-containing feed gas to the vessel.

With reference to FIG. 1, illustrating an embodiment of the process where oxygen is produced, heated oxygen-containing gas 417 is contacted with a reactive solid material 1701 and/or reactive solid material 1703. The reactive solid material may be located outside the containment vessel 413 as represented by reactive solid material 1701, or inside the containment vessel 413 as represented by reactive solid material 1703. One or more contaminant compounds in the heated oxygen-containing gas 417 react with the reactive solid material to form the contaminant-depleted oxygen-containing gas and reacted solid material.

The contaminant-depleted oxygen-containing gas is contacted with a first surface of a membrane in membrane modules 401, 403, 405, 407, and 409. Membrane modules 401, 403, 405, 407, and 409 each comprise a membrane comprising mixed conducting multicomponent metallic oxide. Oxygen is transported through the membranes to a second surface of the membranes to provide transported oxygen. The transported oxygen is removed from the second surface of the membranes as oxygen product 470. The residual gas formed from the contaminant-depleted oxygen-containing gas less the transported oxygen is removed from vessel 413 as oxygen-depleted gas 460.

The process may be an oxidation process. The process may further comprise reacting a hydrocarbon-containing feed gas with the transported oxygen under reaction conditions sufficient to react the hydrocarbon-containing feed gas with the transported oxygen thereby forming an oxidation product. The reaction of the hydrocarbon-containing feed gas and the transported oxygen may be catalyzed by any suitable catalyst known in the art. Reaction conditions sufficient to react the hydrocarbon-containing feed gas with the transported oxygen may include a temperature ranging from 600° C. to 1100° C. and a pressure ranging from 0.2 to 5 MPa.

The membrane may be part of a membrane module. The membrane module may include one or more porous support layers adjacent the membrane that may include one or more catalysts to promote hydrocarbon oxidation, reforming, and/or other reactions that occur in the porous layer. The catalyst or catalysts may be disposed on surfaces of porous support layers, and/or may be dispersed throughout the layer. The one or more catalysts may comprise metals selected from or compounds containing metals selected from the group consisting of platinum, palladium, rhodium, ruthenium, iridium, gold, nickel, cobalt, copper, potassium and mixtures thereof. Various arrangements of porous layers and slotted layers may be used if desired for structural and/or process reasons as disclosed in U.S. Pat. No. 7,425,231.

A hydrocarbon-containing feed gas is any feed gas containing a C1 to C4 hydrocarbon. The hydrocarbon-containing feed gas may further comprise steam. The hydrocarbon-containing feed gas may be heated by any appropriate method to a temperature of 600° C. to 1100° C. and passed to the second surface of the membrane and/or catalyst layers.

The hydrocarbon-containing feed gas may be a mixture of steam and natural gas wherein the natural gas comprises mostly methane with smaller amounts of light hydrocarbons. The mixture may be prereformed at a temperature below about 800° C. to yield a reactant feed gas containing steam, methane, and carbon oxides.

The oxidation product may be synthesis gas comprising hydrogen, carbon monoxide, and water. Synthesis gas is a gas mixture containing at least hydrogen and carbon oxides.

The hydrocarbon-containing feed gas may also contain contaminants. Accordingly, it would be desirable to remove those contaminants prior to reacting the hydrocarbon-containing feed gas with the transported oxygen since the contaminants may degrade the membrane.

The oxidation process may further comprise contacting a heated hydrocarbon-containing gas with a second reactive solid material. The heated hydrocarbon-containing gas comprises a hydrocarbon and one or more contaminant compounds which react with the second reactive solid material.

A heated hydrocarbon-containing gas is any gas containing a C1 to C4 hydrocarbon that has been directly or indirectly heated. Suitable hydrocarbon-containing gases used in ion transport membrane oxidation processes are known in the art. The heated hydrocarbon-containing gas may be formed by indirectly heating a hydrocarbon-containing gas by indirect heat transfer with a fluid that is hotter than hydrocarbon-containing gas in a heat exchanger.

The heated hydrocarbon-containing gas comprises a C1 to C4 hydrocarbon and one or more contaminant compounds, where the one or more contaminant compounds enter the heated hydrocarbon-containing gas from structural components of the reactor systems used in oxygen ion transport membrane processes.

The second reactive solid material may be provided in a second guard bed.

The second reactive solid material may comprise one or more compounds selected from the group consisting of magnesium oxide, calcium oxide, copper oxide, calcium carbonate, sodium carbonate, strontium carbonate, zinc oxide, strontium oxide, sodium oxide, potassium oxide, barium oxide, barium carbonate and alkaline-earth-containing perovskites. The second reactive solid material may be the same or different than the first reactive solid material.

The second reactive solid material may be located at any suitable location for removing contaminants prior to passing the hydrocarbon-containing gas to the membrane. Suitable locations are disclosed in U.S. Pat. No. 7,425,231.

The second reactive solid material is provided as a deposit on a second support. Providing the second reactive solid material as a deposit on a support solves the problem of volume expansion of the second reacted solid material because the combination of a deposit on a support better accommodates the volume expansion. Since the volume expansion of the second reacted solid material is better accommodated, pressure drop through the system is not negatively impacted. By providing a suitable amount of the second reactive solid material, enough capacity to remove contaminants for the desired period may be achieved.

The deposit on the second support may be a layer, coating, or the like. The second reactive solid material or a precursor of the second reactive solid material may be deposited on the second support by a washcoat, incipient wetness impregnation of a dissolved species comprising the second reactive solid material or a precursor of the second reactive solid material, infiltration of a dissolved species comprising the second reactive solid material or a precursor of the second reactive solid material, slurry coating of a suspension comprising the second reactive solid material or a precursor of the second reactive solid material, dip coating of a dissolved or suspended species comprising the second reactive solid material or a precursor of the second reactive solid material, infiltration or dip coating using a molten salt comprising the second reactive solid material or a precursor of the second reactive solid material, combinations of these methods or any other suitable means.

The deposit on the second reactive solid material may be porous.

The second support may comprise at least one of alumina, mullite, zirconia, silicon carbide, magnesium oxide and cordierite. The first support and the second support may be fabricated from the same or different materials. The second support may be a monolithic structure. The second support may be porous. The second reactive material may be deposited within the pores of the second support.

Since the purpose of the deposit of the second reactive material on the second support is to react the contaminant species and not to react the other species in the heated hydrocarbon-containing gas, the process may be such that the heated hydrocarbon-containing gas does not undergo a catalyzed reaction when contacting the second support or any deposits on the second support. The second support may be such that no catalyst is deposited thereon.

The one or more contaminant compounds in the heated hydrocarbon-containing gas reacts with the second reactive solid material under reaction conditions sufficient to react the one or more contaminant compounds in the heated hydrocarbon-containing gas with the second reactive solid material thereby forming the hydrocarbon-containing feed gas and second reacted solid material.

The reaction conditions sufficient to react the one or more contaminant compounds in the heated hydrocarbon-containing gas with the second reactive solid material may include a second temperature ranging from 500° C. to 1100° C. and a second pressure ranging from 2 atm (0.2 MPa) (absolute) to 50 atm (absolute) (5 MPa).

Figure 2:
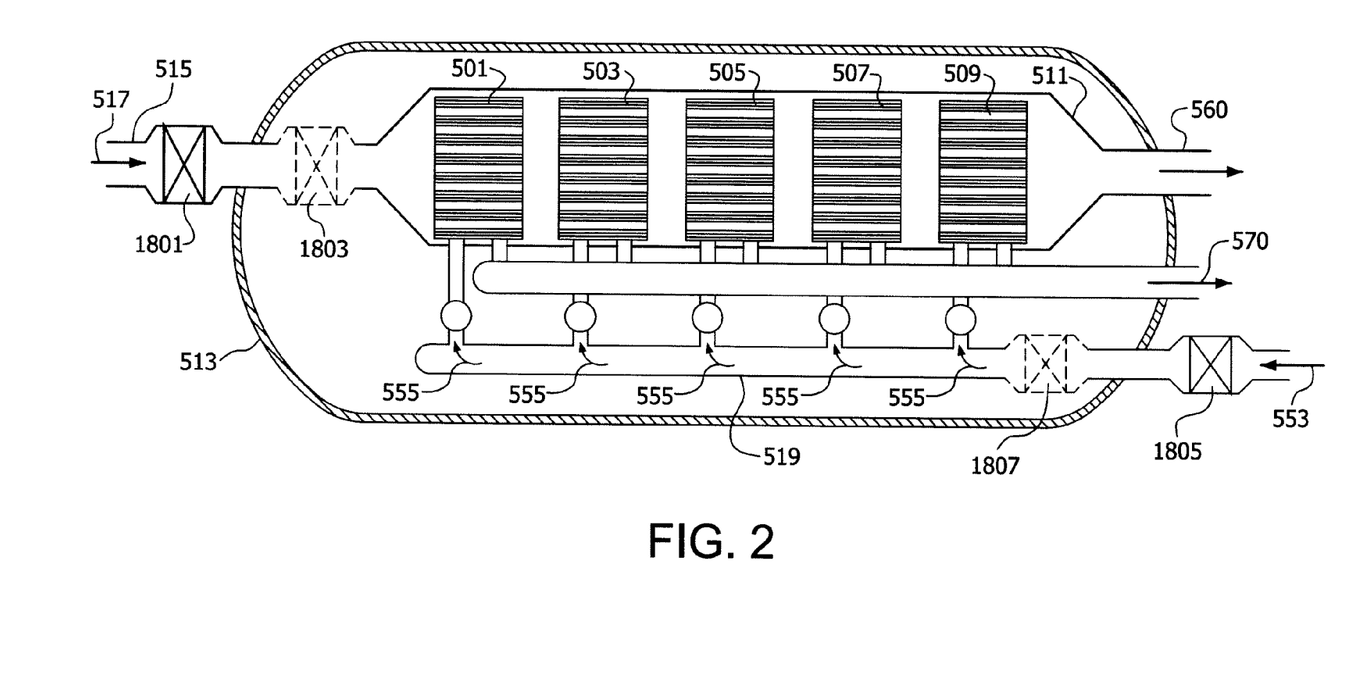
FIG. 2 is a schematic side view of the interior of a membrane reactor vessel for use in oxidation processes that includes reactive solid material for the removal of volatile contaminants from various feed gases to the vessel.

With reference to FIG. 2, illustrating an embodiment of the process where an oxidation product is produced, heated oxygen-containing gas 553 is contacted with a reactive solid material 1805 and/or reactive solid material 1807. The reactive solid material may be located outside the containment vessel 513 as represented by reactive solid material 1805, or inside the containment vessel 513 as represented by reactive solid material 1807. One or more contaminant compounds in the heated oxygen-containing gas 553 react with the reactive solid material to form the contaminant-depleted oxygen-containing gas and reacted solid material.

The contaminant-depleted oxygen-containing gas is contacted with a first surface of a membrane in membrane modules 501, 503, 505, 507, and 509. Membrane modules 501, 503, 505, 507, and 509 each comprise a membrane comprising mixed conducting multicomponent metallic oxide. Details of suitable membrane modules are disclosed in U.S. Pat. No. 7,425,231. Oxygen is transported through the membranes to a second surface of the membranes to provide transported oxygen. The residual gas formed from the contaminant-depleted oxygen-containing gas less the transported oxygen is removed from vessel 513 as oxygen-depleted gas 570.

A heated hydrocarbon-containing gas 517 is contacted with a second reactive solid material 1801 and/or a second solid reactive material 1803. The second reactive solid material may be located outside the containment vessel 513 as represented by reactive solid material 1801, or inside the containment vessel 513 as represented by reactive solid material 1803. One or more contaminant compounds in the heated hydrocarbon-containing gas 517 react with the reactive solid material to form the contaminant-depleted hydrocarbon-containing feed gas and second reacted solid material. The contaminant-depleted hydrocarbon-containing feed gas is contacted with a second surface of a membrane in membrane modules 501, 503, 505, 507, and 509.

The transported oxygen is reacted with a hydrocarbon-containing feed gas to form oxidation product 560.

In one embodiment, MgO may be used as the deposited reactive solid material on a structure to remove these volatile contaminant compounds from the feed gases prior to contact with the membranes in the membrane modules. MgO is an effective reactive material for this service, and it is safe, easily handled, and inexpensive. The partial pressures of the volatile gas-phase contaminants can be reduced by up to several orders of magnitude, which may significantly reduce or eliminate membrane contamination and damage.

The MgO will react with the sulfur-, chromium-, silicon-, and/or tungsten-containing gas phase contaminants to form $MgSO_4$, $MgCr_2O_4$, $Mg_2SiO_4$ and $MgWO_4$, respectively. These reaction products are very stable, safe to handle, and environmentally benign; disposal of spent guard bed material therefore should be simple and inexpensive.

Exemplary reactions which take place at the interface of the gas phase and the solid oxides to form the volatile contaminants described above are as follows:

$$Cr_2O_3 + 2\,H_2O\,(g) + 3/2\,O_2\,(g) = 2\,CrO_2(OH)_2\,(g) \quad (1)$$

$$SiO_2 + 2\,H_2O\,(g) = Si(OH)_4\,(g) \quad (2)$$

$$WO_3 + H_2O\,(g) = WO_2(OH)_2\,(g) \quad (3)$$

$$Cr_2O_3 + 3/2\,O_2\,(g) = 2\,CrO_3\,(g) \quad (4)$$

The reactions which take place in a guard bed filled with MgO are as follows:

$$MgO + 2\,CrO_3\,(g) = MgCr_2O_4 + 3/2\,O_2\,(g) \quad (5)$$

$$MgO + 2\,CrO_2(OH)_2\,(g) = MgCr_2O_4 + 2\,H_2O\,(g) + 3/2\,O_2\,(g) \quad (6)$$

$$2\,MgO + Si(OH)_4\,(g) = Mg_2SiO_4 + 2\,H_2O\,(g) \quad (7)$$

$$MgO + WO_2(OH)_2(g) = MgWO_4 + H_2O\,(g) \quad (8)$$

$$MgO + SO_3\,(g) = MgSO_4 \quad (9)$$

An embodiment employing an MgO-coated cordierite monolithic structure has been demonstrated to be useful for the removal of $CrO_3$ from a high-temperature air stream. The following examples describe various methods of preparation of MgO coated cordierite and demonstrations of its effectiveness for the removal of $CrO_3$ from air.

The following Examples illustrate embodiments of the present invention but do not limit the invention to any of the specific details described therein.

Example 1

A 15 cm×15 cm—15 cm block of 400 cells/in² Celcor® cordierite monolith substrate was obtained from Corning, Inc. This is a commercially available standard product and consists of square and linear open channels through a matrix of porous cordierite having a wall/web thickness of nominally 0.0065 in (0.0165 cm). Using a diamond saw, several smaller samples measuring nominally 1.4 cm×1.4 cm×15 cm long were cut from this block, with the longest dimension parallel to the channels.

Example 2

A 1.4 cm×1.4 cm×15 cm long monolith sample of the material from Example 1 was coated with MgO using the following procedure. A slurry of 46.8 g of MagChem 200-AD (a 200 m²/g MgO powder from Martin Marietta Magnesia Specialties) and 100 g of anhydrous ethanol (Pharmo-Aaper, grade 200 proof) was prepared and placed into a 250 ml polyethylene bottle, along with 35 g of 1 mm Zirconia balls. The mixture was blended on a ball mill at 60 rev/min for 4 hours to break up agglomerates of MgO particles and ensure adequate dispersion of the MgO into the liquid. The bottle was removed from the ball mill and then the monolith sample was coated by dipping it, with the slots positioned vertically, into the MgO/ethanol slurry, allowing a few seconds of immersion, and then withdrawing it from the slurry. Upon withdrawal, slurry, partially depleted of MgO, gravity-drained from the monolith channels leaving behind a thin coating of MgO on the inside walls of the monolith channels. The monolith was dried in a nitrogen atmosphere and then calcined in air at 1000° C. for 2 hr. This method coated the monolith channels with a layer of MgO that was 5 μm-10 μm thick. The MgO loading, based on cordierite substrate mass, was estimated to be 7.4 wt %.

Example 3

A second MgO coated monolith sample was prepared using the procedure of Example 2. The MgO loading, based on cordierite substrate mass, was estimated to be 6.0 wt %.

Example 4

A 1.4 cm×1.4 cm×15 cm long monolith sample of the material from Example 1 was coated with MgO using the following procedure using the precursor magnesium nitrate hexahydrate. A mixture of 80.69 g of magnesium nitrate hexahydrate ($Mg(NO_3)_2 \cdot 6H_2O$, Alfa Aesar, ACS grade), 70 g of deionized water, and 35 g of zirconia 1 mm ball media was prepared in a 250 ml polyethylene bottle. The mixture was blended on a ball mill at 60 rev/min for 4 hr to ensure complete dissolution of the magnesium nitrate hexahydrate. The monolith sample was coated with magnesium nitrate hexahydrate, dried, and calcined using the same procedure as described in Example 2. This coating, drying, and calcining procedure was repeated 3 times on a single monolith sample. The magnesium nitrate hexahydrate decomposes to MgO during the high temperature calcinations. Since the dissolved magnesium nitrate hexahydrate thoroughly penetrates the porous walls/webs of the cordierite, it is expected that MgO was dispersed on the surface throughout the porous walls/webs. After the final calcination, the MgO loading was estimated to be 5.5 wt %.

Example 5

This MgO-coated monolith sample was prepared in two steps: by first coating and calcining with magnesium nitrate hexahydrate dissolved in ethanol and secondly with an MgO powder/ethanol slurry. For the first step, 59.9 g of magnesium nitrate hexandyrate, 41 g of ethanol, and 35 g of 1 mm zirconia ball media were placed in a 250 ml Nalgene bottle. This was then blended on a ball mill at 60 rev/min for 4 hr to ensure complete dissolution of the magnesium nitrate hexahydrate. The monolith sample was coated using the same procedure as described in Example 4, except the sample was only dipped and calcined one time. The second coating step used the same materials, proportions of materials, and methods as that for Example 2. This method coated the internal porosity of the monolith as well as coated the inside of monolith channels with an MgO layer. The MgO loading was estimated to be 6.0 wt %.

The following procedures and equipment were used to test the effectiveness of each of the samples prepared in Examples 1-5 for the removal of $CO_3$ from a heated air stream. All channels, except for the centrally located 3×3 grid (9 channels total) in the center of each 1.4 cm×1.4 cm×15 cm long monolith test sample from Examples 1 through 5, was cemented closed using a low-expansion ceramic cement in order to block air flow through those channels. This ensures that, when tested using a flow of $CrO_3$-saturated heated air, that all air flow is through a defined cross sectional area of the monolith test sample. After curing of the cement, the test sample was mounted in a tubular sample holder constructed of Incoloy 800 H round tubing of 1.6 cm ID. The sample holder was equipped with a flat end fitting with a centrally located 0.6 cm diameter air inlet port. A 0.6 cm ID×1.2 cm OD Thermiculite sheet gasket is inserted at the end of the sample holder, followed by the monolith test sample, another Thermiculite gasket, and then a long spring-loaded hollow push rod to compress the gaskets and test piece to prevent gas bypass and ensure that all heated air flows through the centrally located 3×3 grid of unclosed channels. Welded to the inlet port of the sample holder was a coil of 0.6 cm OD×0.46 cm ID wall×6.1 m long Incoloy 800 H tubing that functioned as an air preheater and a means of simultaneously saturating the heated air with $CrO_3$. The entire assembly of sample holder with sample and inlet tubing coil was inserted into an electrically-heated pressure vessel. The pressure vessel was sealed by a bolted flange closure equipped with a port through which the air feed was introduced and connected to the inlet tubing coil. After passage through the sample, air was vented from the pressure vessel through an exit port in the side of the vessel. The air pressure was regulated by a back pressure regulator located in the air exit stream and the air inlet flow rate was controlled by a thermal mass flow controller.

For the tests described in Examples 6-10 below, after mounting the sample in the sample holder, connecting the air supply, and then sealing the vessel at the flange closure, the vessel and contents were heated to 875° C. with 1.9 std. Liter/min (slpm) of air flowing at 0.3 MPa. When 875° C. was reached, the air pressure was increased to 1.5 MPa and the flow increased to 9.3 slpm. The concentration of $CrO_3$ in the in the feed air at these conditions is estimated to be 3 ppbv. The samples and contents were maintained at these conditions for nominally 20-30 days, after which the unit was cooled to ambient temperature, depressurized, and the flow stopped. The monolith test sample was then removed from the unit and all of the material outside of the 3×3 unclosed grid was cut away from the sample using a razor knife. The central 3×3 grid section was then cut into six nominally 2.54 cm long pieces and the length and mass of each piece was measured. The elemental Cr concentration of each piece was determined by acid digestion followed by quantitative inductively couple plasma atomic emission spectroscopy. The background level of Cr in an untested sample was also determined and was subtracted from the concentration measured for the test sample pieces. The effectiveness of the test sample is indicated by the concentration level of Cr in the pieces as well as the steepness of the axial gradient in Cr concentration from the feed end to the effluent end of the test sample.

Example 6

Figure 3:
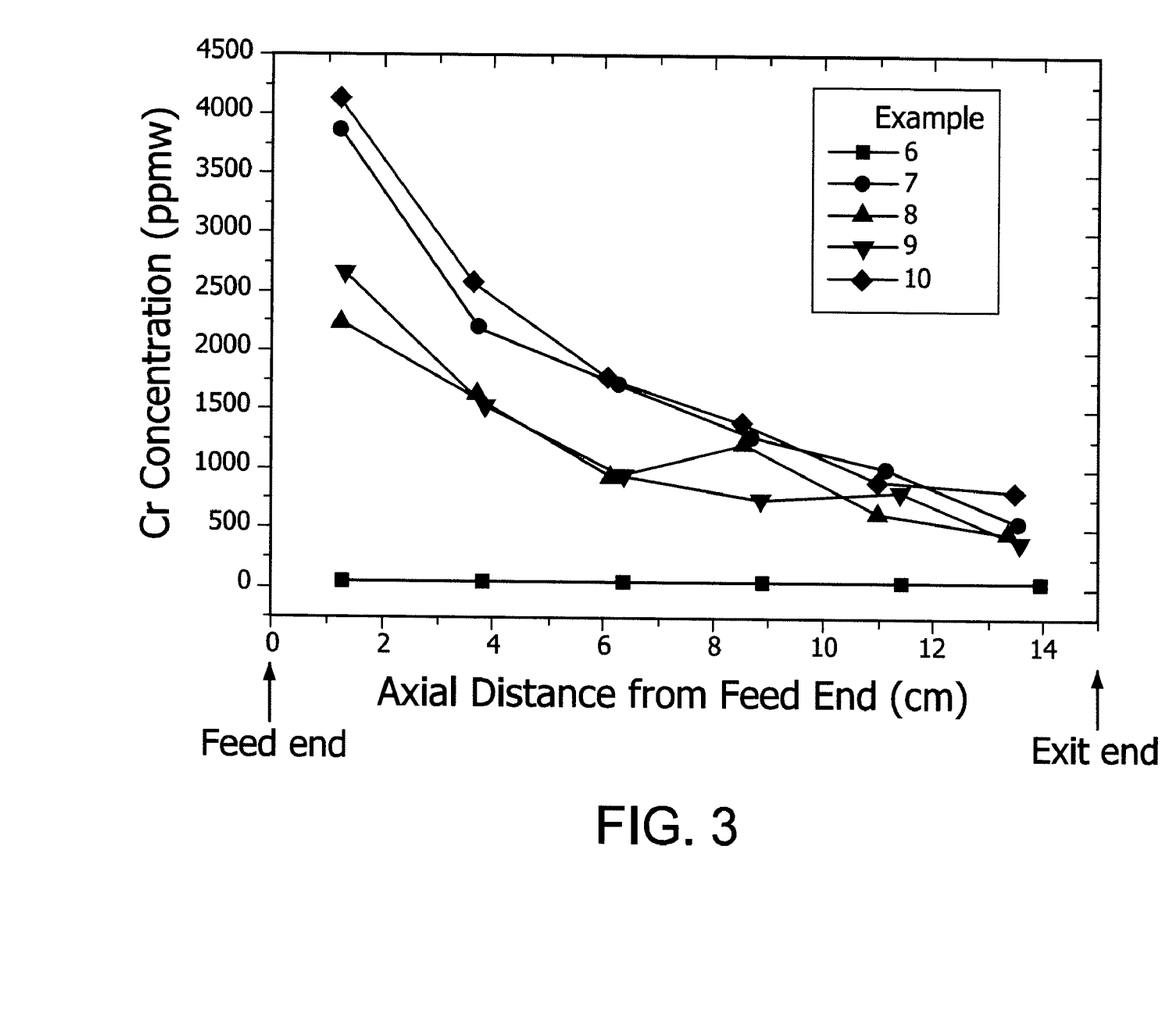
FIG. 3 is a plot of chromium concentration as a function of axial distance from the feed end for various samples exposed to a gas containing $CrO_3$.

A uncoated monolith sample, prepared as described in Example 1 was tested for $CrO_3$ removal effectiveness using the procedures and equipment described above. The sample was at full operating conditions for 27 days. The axial Cr concentration profile in the post-run test sample is shown in FIG. 3.

Example 7

The coated monolith sample prepared in Example 2 was tested for $CrO_3$ removal effectiveness using the procedures and equipment described above. The sample was at full operating conditions for 30 days. The axial Cr concentration profile in the post-run test sample is shown in FIG. 3.

Example 8

The coated monolith sample prepared in Example 3 was tested for $CrO_3$ removal effectiveness using the procedures and equipment described above. The sample was at full operating conditions for 30.2 days. The axial Cr concentration profile in the post-run test sample is shown in FIG. 3.

Example 9

The coated monolith sample prepared in Example 4 was tested for $CrO_3$ removal effectiveness using the procedures and equipment described above. The sample was at full operating conditions for 20.5 days. The axial Cr concentration profile in the post-run test sample is shown in FIG. 3.

Example 10

The coated monolith sample prepared in Example 5 was tested for $CrO_3$ removal effectiveness using the procedures and equipment described above. The sample was at full operating conditions for 31.4 days. The axial Cr concentration profile in the post-run test sample is shown in FIG. 3.

We claim:

1. An oxygen ion transport membrane process comprising:
   (a) contacting a heated oxygen-containing gas with a reactive solid material, the heated oxygen-containing gas comprising oxygen and one or more contaminant compounds wherein at least one of the one or more contaminant compounds in the heated oxygen-containing gas is $CrO_2(OH)_2$, $Si(OH)_4$, $WO_2(OH)_2$, $CrO)_3$, oxides of molybdenum, or oxy-hydroxides of molybdenum, the reactive solid material provided as a deposit on a support wherein the reactive solid material comprises one or more compounds selected from the group consisting of magnesium oxide, calcium carbonate, strontium carbonate, zinc oxide, strontium oxide, barium oxide, barium carbonate, and alkaline-earth-containing perovskites, reacting the one or more contaminant compounds in the heated oxygen-containing gas with the reactive solid material under reaction conditions sufficient to react the one or more contaminant compounds with the reactive solid material thereby forming a contaminant-depleted oxygen-containing gas and reacted solid material;
   (b) contacting the contaminant-depleted oxygen-containing gas with a first surface of a membrane comprising mixed conducting multicomponent metallic oxide, and transporting oxygen through the membrane to a second surface of the membrane to provide transported oxygen.

2. The process according to claim 1 wherein the reaction conditions sufficient to react the one or more contaminant compounds with the reactive solid material include a first temperature ranging from 100° C. to 1100° C. and a first pressure ranging from 1.5 atm (0.15 MPa) (absolute) to 40 atm (absolute) (4.05 MPa).

3. The process according to claim 1 wherein the support comprises one or more compounds selected from the group consisting of alumina, mullite, zirconia, silicon carbide, magnesium oxide, and cordierite.

4. The process according to claim 1 wherein the heated oxygen-containing gas does not undergo a catalyzed reaction when contacting the support or any deposits on the support.

5. The process according to claim 1 wherein at least one of the one or more contaminant compounds in the heated oxygen-containing gas is also $SO_2$, $SO_3$, or $H_2SO_4$.

6. The process according to claim 1 further comprising:
reacting a hydrocarbon-containing feed gas with the transported oxygen under reaction conditions sufficient to react the hydrocarbon-containing feed gas with the transported oxygen thereby forming an oxidation product.

7. The process according to claim 6 wherein the reaction conditions sufficient to react the hydrocarbon-containing feed gas with the transported oxygen include a temperature ranging from 600° C. to 1100° C. and a pressure ranging from 0.2 to 5 MPa.

8. The process according to claim 6 further comprising:
contacting a heated hydrocarbon-containing gas with a second reactive solid material, the heated hydrocarbon-containing gas comprising a hydrocarbon and one or more contaminant compounds, the second reactive solid material provided as a deposit on a second support and reacting the one or more contaminant compounds in the heated hydrocarbon-containing gas with the second reactive solid material under reaction conditions sufficient to react the one or more contaminant compounds in the heated hydrocarbon-containing gas with the second reactive solid material thereby forming the hydrocarbon-containing feed gas and a second reacted solid material.

9. The process according to claim 8 wherein the reaction conditions sufficient to react the one or more contaminant compounds in the heated hydrocarbon-containing gas with the second reactive solid material include a second temperature ranging from 500° C. to 1100° C. and a second pressure ranging from 0.2 MPa to 5 MPa.

10. The process according to claim 8 wherein the heated hydrocarbon-containing gas does not undergo a catalyzed reaction when contacting the second support or any deposits on the second support.

11. The process according to claim 8 wherein at least one of the one or more contaminant compounds in the heated hydrocarbon-containing gas is $Si(OH)_4$, $WO_2(OH)_2$, oxides of molybdenum, or oxy-hydroxides of molybdenum.

12. The process according to claim 8 wherein the second reactive solid material comprises one or more compounds selected from the group consisting of magnesium oxide, calcium oxide, copper oxide, calcium carbonate, sodium carbonate, strontium carbonate, zinc oxide, strontium oxide, sodium oxide, potassium oxide, barium oxide, barium carbonate and alkaline-earth-containing perovskites.

\* \* \* \* \*